United States Patent
McCarthy, Jr. et al.

(10) Patent No.: US 11,744,229 B2
(45) Date of Patent: Sep. 5, 2023

(54) RESTRAINING SYSTEM WITH A RETRACTION MECHANISM

(71) Applicant: CFO Technology Corporation, San Diego, CA (US)

(72) Inventors: Michael John McCarthy, Jr., San Diego, CA (US); Elisabeth McCarthy, San Diego, CA (US); Maura McCarthy, San Diego, CA (US); Anne Ruckel McCarthy, San Diego, CA (US)

(73) Assignee: CFO Technology Corporation, San Diego, CA (US)

( * ) Notice: Subject to any disclaimer, the term of this patent is extended or adjusted under 35 U.S.C. 154(b) by 722 days.

(21) Appl. No.: 16/560,921

(22) Filed: Sep. 4, 2019

(65) Prior Publication Data

US 2021/0059217 A1     Mar. 4, 2021

(51) Int. Cl.
*A01K 27/00*     (2006.01)

(52) U.S. Cl.
CPC ................................. *A01K 27/004* (2013.01)

(58) Field of Classification Search
CPC .. A01K 27/004; A01K 27/001; A01K 27/003; A01K 27/005; A01K 27/00; A47D 13/086; A44C 5/18; A44B 11/00; Y10T 24/45723

USPC .................................................. 119/796, 794
See application file for complete search history.

(56) References Cited

U.S. PATENT DOCUMENTS

| 3,250,253 | A | * | 5/1966 | Galin | A01K 27/001 119/794 |
| 2002/0096128 | A1 | * | 7/2002 | Cohn | A01K 27/004 119/793 |
| 2011/0036304 | A1 | * | 2/2011 | Smith | A01K 27/004 119/796 |
| 2016/0242393 | A1 | * | 8/2016 | Kennedy | A01K 27/009 |

* cited by examiner

*Primary Examiner* — Peter M Poon
*Assistant Examiner* — Jeffrey R Larsen
(74) *Attorney, Agent, or Firm* — Sheppard Mullin Richter & Hampton LLP

(57) ABSTRACT

A single-unit restraining system for exercising control over a subject is provided. The restraining system comprises an attachment element adapted to be removably attached around a subject and encasing a retraction mechanism configured to extend and retract a tether element. The retraction mechanism comprises a multi-spool configuration which allows spooling or coiling of the tether element into the attachment element without requiring the tether element to complete 360-degree revolutions around a vertical axis. Tension forces associated with spooling the tether element are reduced and potential harm to the subject is reduced. The restraining system is configured to detach from the subject upon detecting tension forces exceeding a threshold amount.

17 Claims, 5 Drawing Sheets

RESTRAINING SYSTEM WITH A RETRACTION MECHANISM

TECHNICAL FIELD

The present disclosure is generally related to a restraining system for exercising control over a subject. More particularly, the present disclosure is directed to a single-unit restraining system that uses a retraction mechanism encased by an attachment element of the restraining system for extending and retracting a tether element.

BACKGROUND

Pet owners often utilize some sort of a restraining system to exercise control over their pets in public places to prevent the pets from roaming freely and/or to comply with local laws and ordinances. Conventionally, the restraining system comprises an attachment element, such as a pet collar placed around an animal's neck, to which a tether element, such as a leash, is attached. The attachment element may also be used for placing pet identification information. For example, the collar may include loops or similar elements on which tags with printed pet identification information may be hung. However, because of the limited size of the tag, only minimal information can be printed.

This conventional leash and collar combination may, however, be inconvenient as it requires use of two separate elements (i.e., an attachment element and a tether element). For example, when the pet owner enters an area designated for pets running without restraint, the owners end up carrying the leash, which can be burdensome. Moreover, conventional restraining systems include two separate elements, which often results in the leash being lost or misplaced when not in use by the handler.

SUMMARY

In accordance with one or more embodiments, various features and functionality can be provided to enable or otherwise facilitate extraction and retraction of a tether element encased within an attachment element of a single-unit restraining system.

In some embodiments, the single-unit restraining system may comprise a tether element having a fixed end, a free end opposite the fixed end, a length therebetween, and an attachment element comprising a first end and a second end, the first end and the second end adapted to be removably attached together. In some embodiments, the attachment element may encase a retraction mechanism configured to extend and retract the tether element. In some embodiments, the retraction mechanism may comprise a multi-spool configuration. For example, the retraction mechanism may comprise a first spool and a second spool. In some embodiments, the fixed end of the tether element may be attached to the first spool.

In some embodiments, the tether element may be in a fully extended position when the retraction mechanism extends the tether element. Similarly, the tether element may be in a fully retracted position when the retraction mechanism retracts the tether element.

In some embodiments, the length of the tether element may comprise an extendable portion and a non-extendable portion. In some embodiments, a distance from the free end to the attachment element may be substantially equal to the extendable portion of the length of the tether element when the tether element is in the fully extended position.

In some embodiments, the attachment element may comprise an opening through which the tether element may be extended and retracted. In some embodiments, the free end of the tether element may comprise a handle adapted to be recessed into the attachment element when the tether is in the fully retracted position.

In some embodiments, the retraction mechanism may extend the tether upon applying an external force to the free end of the tether element. Similarly, the retraction mechanism may retract the tether when no external force is applied to the free end of the tether element.

In some embodiments, the restraining system may comprise a locking mechanism configured to prevent the retraction mechanism from extending or retracting the tether element further.

In some embodiments, the restraining system may comprise a sensor configured to detect a tension force within the attachment element. In some embodiments, the first and second ends of the attachment element may be detached upon detecting the tension force within the attachment element being greater than a threshold amount.

Other features and aspects of the disclosed technology will become apparent from the following detailed description, taken in conjunction with the accompanying drawings, which illustrate, by way of example, the features in accordance with embodiments of the disclosed technology. The summary is not intended to limit the scope of any inventions described herein, which are defined solely by the claims attached hereto.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

Figure 1:
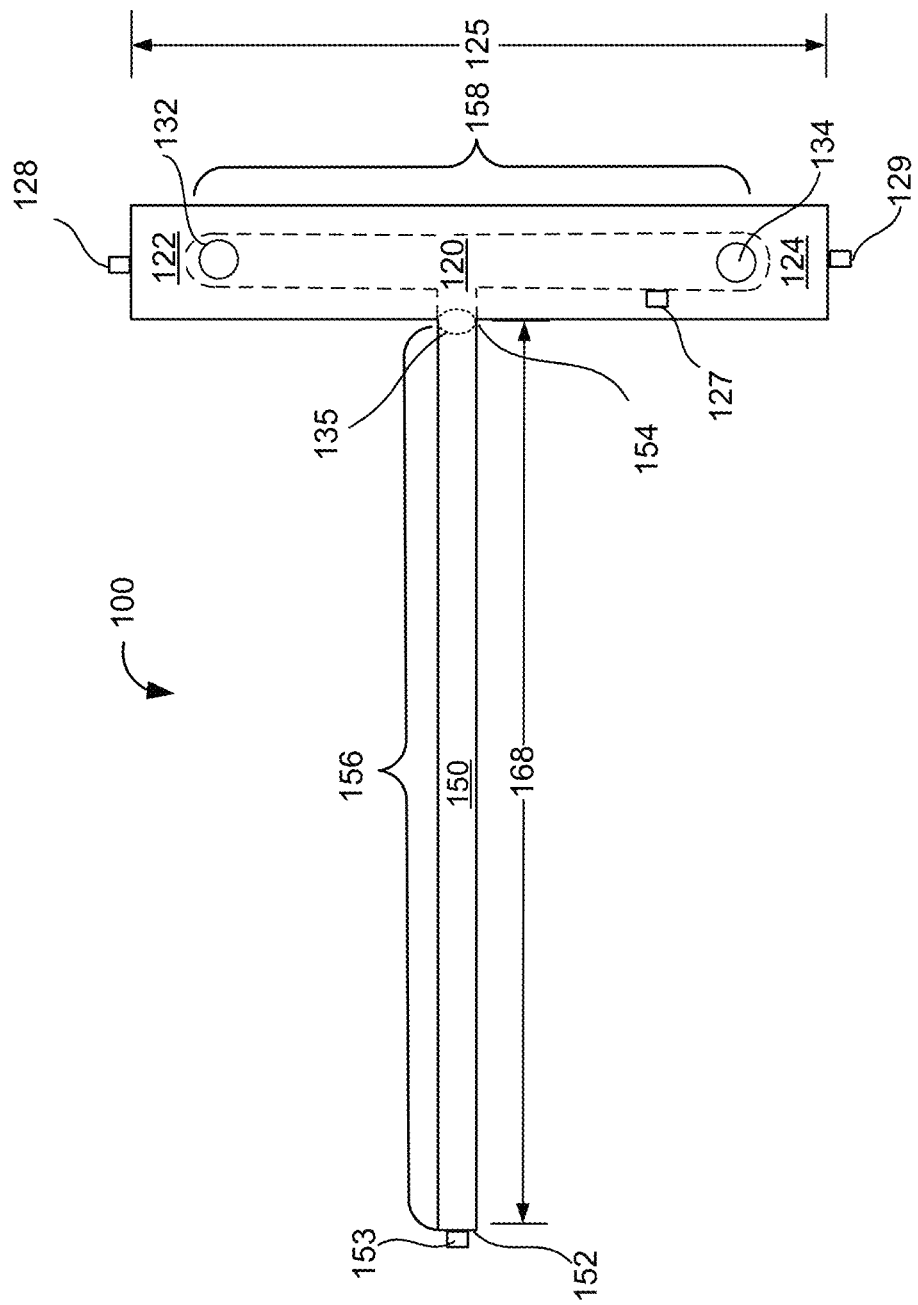
FIG. 1 illustrates a restraining system comprising an attachment element and a tether element, according to an implementation of the disclosure.

The figures are not exhaustive and do not limit the present disclosure to the precise form disclosed.

DETAILED DESCRIPTION

Described herein is a restraining system for exercising control over a subject. The details of some example embodiments of the systems and methods of the present disclosure are set forth in the description below. Other features, objects, and advantages of the disclosure will be apparent to one of skill in the art upon examination of the following description, drawings, examples and claims. It is intended that all such additional systems, methods, features, and advantages be included within this description, be within the scope of the present disclosure, and be protected by the accompanying claims.

A conventional restraining system comprising an attachment element (e.g., a collar) to which a tether element (e.g., a leash) can be connected is used by pet owners to exercise control over their pets. However, such a restraining system comprising at least two elements is inconvenient for pet owners. By way of example, pet owners are forced to carry the tether element during the time they do not need to control the pet (e.g., in a contained area) subjecting the owners to a potential loss of the tether element.

Further, pet owners are limited by the effective length of the tether element, as it is fixed and cannot be shortened and/or lengthened on demand. Often, restraining systems may include a retraction mechanism which allows the owners to extend and/or retract the tether element. The retraction mechanism (e.g., a retractable reel) may be located within a portion of the tether element held by the pet owner (e.g., a handle). While placing the retraction mechanism within the handle of the tether element allows pet owners to increase and decrease the leash length, it does not address the issue of the restraining system comprising two distinct elements. Accordingly, when using a conventional restraining system that includes a retraction mechanism located within the leash handle, pet owners are still left with carrying the handle into which the leash has been retracted when their pet is unrestrained.

Moreover, some conventional restraining systems may include a retraction mechanism that causes the tether element to be wrapped around the interior circumference of the attachment element. However, when wounding or spooling the tether element onto the attachment element (effectively acting as a single spool), this type of retraction mechanism requires the attachment element to have a continuous interior surface (e.g., circular or elliptical). Accordingly, using the attachment element as a single spool prevents the attachment element from being removably secured around a subject (e.g., around a pet's neck). Instead, the attachment element must be slipped on and off the subject. Without the attachment element having a way to unclasp, this results in an increased difficulty of placing the attachment element onto the subject. That is, it is easier for the owner to clasp two ends of the attachment element around a pet's neck rather than force the pet's head through a circular opening defined by the attachment mechanism.

Further, by virtue of using the attachment element as a single-element spool, the wrapping or coiling of the tether element around the attachment element results in unfavorable tension forces around the subject. As the tether element coils around the attachment element, the tension forces increase resulting in potentially harmful conditions and even pet strangulation. Thus, while conventional restraining systems address the multi-unit problem (i.e., by retracting the tether element into the attachment element), the result is less than desirable and even dangerous.

Accordingly, various embodiments of the present disclosure are directed to improvements to the safety of a single-unit restraining system with a retractable mechanism which leverages a multi-spool configuration. That is, by using a multi-spool configuration, not only can the retraction mechanism can be placed within the attachment element rather than within the handle element of a tether, the retraction is performed safely (i.e., without causing potential harm to the subject).

In some embodiments, by virtue of retracting the tether element into the attachment element, both the attachment and tether elements remain with the animal at all times. Thus, the single-unit restraining system eliminates the need to carry the handle/leash element. Therefore, the single-unit restraining system results in more efficient use and reduces a likelihood of losing the tether element leash when it is not coupled to the attachment element.

In some embodiments, the attachment element may be configured to become unsecured (e.g., uncoupled) upon detecting a change in pressure and/or tension forces within the attachment element. For example, situations may exist where the animal is trapped and/or is in danger and needs to break away from the collar. Accordingly, an animal may apply pressure against the attachment element which may cause the coupling mechanism holding the ends of the attachment element around the animal's neck to uncouple, allowing the animal to break free.

In particular, as alluded to above, some embodiments may comprise a restraining system having a retraction mechanism configured to spool a tether element into an attachment element resulting in a safer restating system compared to conventional restraining systems. For example, a restraining system configured in accordance with various embodiments may include a retraction mechanism that results in a tether element being extended from and retracted into an attachment element using a multi-spool retraction mechanism placed within the attachment element. That is, rather than spooling the tether element around the attachment element (i.e., the attachment element acting as a single spool with a vertical axis about a pet's neck), the tether element is spooled onto a multi-spool mechanism placed within the attachment element. This multi-spool retraction mechanism reduces potential pet strangulation. For example, by virtue of using the multi-spool retraction mechanism, which allows the tether element to be spooled onto the multiple spooling elements, the restraining system avoids the tether element having to complete 360-degree rotations about the vertical axis. As alluded to above, the 360-degree coiling of the tether element around the pet's neck is associated with an increase in tension forces. That is, the tension forces caused by the spooling of the tether element may be translated onto a subject to which the attachment element is secured. Accordingly, by using a multi-spool retraction mechanism encased within the attachment element allows the tether element to be retracted onto individual spools without having to complete the 360-degree rotations associated with using the attachment element acting as a single-spool mechanism. This, in turn, results in a reduction of tension forces acting around the subject that may cause harm to the pet (e.g., strangulation).

Moreover, various embodiments effectuate a particular direction of rotation of individual spools of the multi-spool retraction mechanism as the tether element is extending or retracting. This allows the pet owner to effectuate control over a pet with a restraining system in a manner that does not cause potential pet strangulation. Additionally, because the collar can be unclasped by virtue of detecting pressure or tension, the restraining system allows the pet to "breakaway" from the attachment element in the event of a situation that requires the pet to be unrestrained.

It should be understood that the systems and methods disclosed herein can be applied to existing imaging systems and methods. In some embodiments, a restraining system comprising the retractable mechanism in accordance with various embodiments may be controlled by a restraining circuit implemented in or as part of the restraining systems' control unit. The restraining circuit can receive data from one or more sensors or derive data based on sensor data regarding the direction and movement of the tether element and/or the tension forces generated by the spooling of the tether element in order to effectuate one or more safety mechanism described in greater detail below.

FIG. 1 depicts an example restraining system 100 configured in accordance with one embodiment. Restraining system 100 or components/features thereof may be implemented in combination with, or as an alternative to, other systems/features/components described herein, such as those described with reference to other embodiments and figures. Restraining system 100 may additionally be utilized in any of the methods for using such systems/components/features described herein. Restraining system 100 may also be used in various applications and/or permutations, which may or may not be noted in the illustrative embodiments described herein. For instance, in some embodiments, restraining system 100 may include more or less features/components than those shown in FIG. 1. Moreover, restraining system 100 is not limited to the size, shape, number of components, etc. specifically shown in FIG. 1, although one or more aspects of restraining system 100 may have particular size/shape constraints in certain embodiments, as these one or more aspects may impact the overall safety of restraining system 100.

An example restraining system operating in a safer manner than conventional restraining systems may be implemented as illustrated in FIG. 1. As shown in FIG. 1, restraining system 100 comprises an attachment element 120, defined by a length 125 and having a first end 122 and a second end 124, and a tether element 150 comprising an extendable portion 156 and a non-extendable portion 158. In some embodiments, extendable portion 156 of tether element 150 may include a first end 152 and a second end 154. In some embodiments, first end 152 of tether element 150 may be a free end and second end 154 may be a fixed end. For example, a user, such as a pet owner, may hold the free end 152 of tether element 150 when effectuating control over a subject, such as a pet. In some embodiments, first end 152 of extendable portion 156 of tether element 150 may comprise a gripping element 153 (e.g., handle) configured to be gripped by the owner when exercising control of a pet, as alluded to above. In some embodiments, gripping element 153 may be configured to fit within an aperture 135 located within attachment element 120 when extendable portion 156 of tether element 150 is withdrawn into to attachment element 120. In some embodiments, gripping element 153 may be fully recessed within the aperture 135 of attachment element 120. In yet other embodiments, gripping element 153 may be partially recessed within the aperture 135 of attachment element 120.

In some embodiments, attachment element 120 may be configured to be removably secured around a subject. For example, attachment element 120 may be removably secured around the neck of a pet which the pet owner seeks to control. In some embodiments, attachment element 120 may include a harness configured to be secured around a pet's torso. In some embodiments, first and second ends 122, 124 of attachment element 120 may each include coupling members 128, 129, respectively configured to removably secure first and second ends 122, 124 of attachment element 120 together. In particular, first and second ends 122, 124 of attachment element 120 may be secured via coupling members 128, 129, as attachment element 120 is being placed around the subject. For example, the coupling member 128 may include a male buckle clip fastener configured to mate with a corresponding female buckle clip fastener of the coupling member 129. In some embodiments, coupling members 128, 129 may comprise corresponding members of a buckle assembly, a loop and hook assembly (e.g., Velcro), a snap assembly, and/or such coupling assemblies.

In some embodiments, coupling members 128, 129 may comprise a male-female clasp combination designed to be uncoupled break apart. For example, when sufficient pressure and/or force is applied by the animal onto attachment member 120 and/or coupling members 128, 129, coupling member 128, may unclasp from coupling member 129 thereby unrecurring attachment element 120 from animal's neck. As alluded to above, this is particularly important when animal is in distress and needs to break away from attachment element 120. By virtue of coupling members 128, 129, unclasping allows restraining system 100 to provide a safe way to restrain animals.

As used herein in some embodiments, the term "subject" may refer to an object that is being controlled by a user (e.g., a pet owner). As discussed in greater detail below, the object may also comprise a pet, such as dog, a cat, or a person, such as a child.

In some embodiments, attachment element 120 may encase one or more components configured to effectuate winding and unwinding of extendable portion 156 of tether element 150, and/or other components. In some embodiments, attachment element 120 may be configured to house extendable portion 156 and non-extendable portion 158 of tether element 150, and one or more components of a retraction mechanism (e.g., spool structures 132, 134) configured to extend and/or retract extendable portion 156 of tether element 150.

In some embodiments, tether element 150 may be fabricated from any suitable material conventionally used to make leashes. For example, the tether element 120 may be made using nylon, leather, silicone, and/or resin and/or other suitable materials. In some embodiments, the material used to fabricate the tether element 120 may include fabric capable of extending the length 168 of extendable portion 156 of tether element 150.

In some embodiments, attachment element 120 may be fabricated from any suitable material conventionally used to make elements configured to be removably secured around a subject. For example, attachment element 120 may be made using nylon, leather, silicone, plastic, and/or resin and/or other suitable materials. In some embodiments, the material used to fabricate attachment element 120 may include fabric capable of stretching beyond the length 125 of the attachment element 125. For example, by virtue of being fabricated from a material capable of stretching, attachment element 120 would be securable around subjects having widths of varying diameters.

In some embodiments attachment element 120 may comprise a plastic shell configured to house one or more components of restraining system 100, as alluded to above. In some embodiments the plastic shell of attachment element 120 may comprise a first and second component (not shown) configured to be removably attached to one another. For example, the top component of attachments element 120 may comprise one or more locking components (not shown) configured to be inserted into corresponding apertures (not shown) within the second component of attachment element 120.

In some embodiments, as alluded to earlier, the retraction mechanism encased by attachment element 120 may comprise a first spool structure 132 and a second spool structure 134 configured to maintain and control the movement of non-extendable portion 158 and extendable portion 156 of tether element 150, respectively during the use of the restraining system. The first and second spool structures 132, 134 may be positioned within attachment element 120 at a distance permitted by the length 125 of attachment element 120. The size including the diameter of the first and second spools may be appropriately sized so as to accommodate placement of the first and second spools within an interior space of attachment element 120. In some embodiments, first and second spool structures 132, 134 of the retraction mechanism may be mounted or attached within an interior space of attachment element 120.

In some embodiments, first and second spool structures 132, 134 may be configured to rotate in one or more directions as the tether element is extend and/or retracted. For example, first spool structure 132 may be configured to rotate clockwise while second spool structure 134 may be configured to rotate counterclockwise when tether element 150 is extended. Similarly, first spool structure 132 may be configured to rotate counterclockwise while second spool structure 134 may be configured to rotate clockwise when tether element 150 is retracted. In some embodiments, first and second spool structures 132, 134 of the retraction mechanism may be spring loaded or spring powered, as describe in detail below.

In some embodiments, the retraction mechanism encased by attachment element 120 may comprise a locking mechanism (not shown) configured to prevent at least one of the spool structures 132, 134 from rotating. For example, the locking mechanism may be configured to prevent the rotation of the spool structures 132, 134 upon extending extendable portion 156 of tether element 150 fully.

In some embodiments, when an external force is applied onto first end 152 of extendable portion 156 of the tether element, the retraction mechanism comprising the first and second spool structures 132, 134 may be configured to extend tether element 150 to its maximum permissible length 168, as described in greater detail below. In some embodiments, extendable portion 156 of tether element 150 may be extended through the aperture 135 located within attachment element 120. As set forth above, extendable portion 156 of tether element 150 may be extended by holding gripping element 153 on the free end of extendable portion 156 of tether element 150.

Figure 2A:
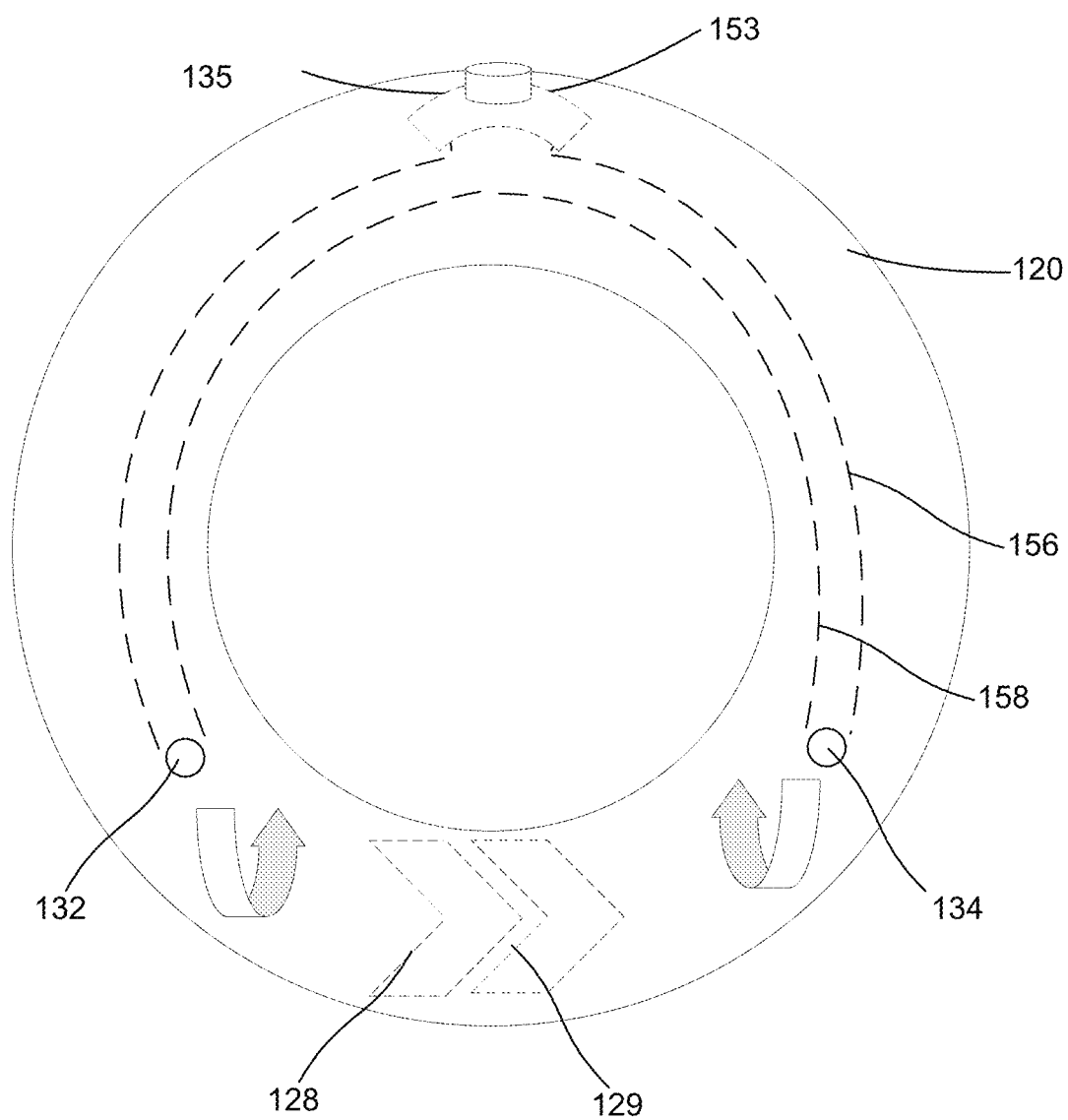
FIG. 2A illustrates a cross-sectional, side view of the attachment element of the restraining system of FIG. 1 with the tether element in a retracted position, according to an implementation of the disclosure.
Figure 2B:
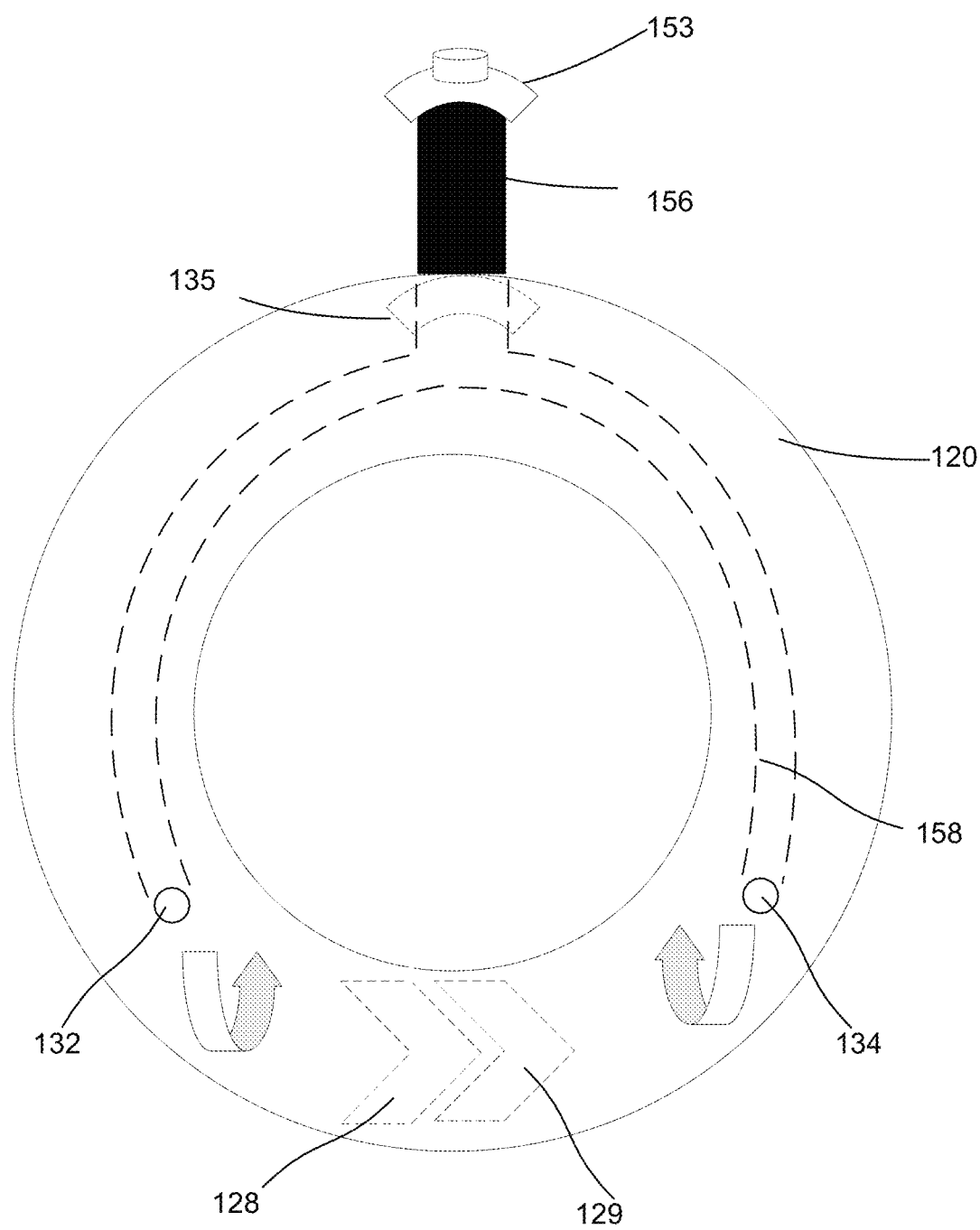
FIG. 2B illustrates a cross-sectional, side view of the attachment element of the restraining system of FIG. 1 with the tether element in an extended position, according to an implementation of the disclosure.

An example restraining system configured to extend and/or retract a tether element into an attachment element in a safer way than conventional restraining systems may be implemented as illustrated in FIGS. 2A-2B. FIG. 2A provides a cross-sectional, side view of attachment element 120 of restraining system 100 in which tether element 150 is in a fully retracted position. FIG. 2B provides a cross-sectional, side view of attachment element 120 of restraining system 100 in which tether element 150 is in a fully extended position. In some embodiments, a user may operate restraining system 100 by applying a pulling force onto a gripping element 153 (e.g., a handle) configured to be recessed within the aperture 135 of attachment element 120, as illustrated in FIG. 2A. For example, as the force is applied on gripping element 153 (e.g., by pulling gripping element 153), the first and second spool structures 132, 134 may be configured to rotate and unwind tether element 150 that may be wound onto the spool structures 132, 134. Upon extending extendable portion 156 of tether element 150 fully, as illustrated in FIG. 2B, for example, the locking mechanism (not illustrated) may prevent the rotation of the spool structures 132, 134.

In some embodiments, the retraction mechanism of restraining system 100 may be configured to extend and/or retract extendable portion 156 of tether element 150 only when the attachment element is secured around a subject. For example, when attachment element 120 is removed from the subject, the retraction mechanism may not allow tether element 150 to extend and/or retract.

In some embodiments, as alluded to above, attachment element 120 may comprise a lightweight plastic shell. For example, the retraction mechanism may be housed inside attachment element 120 comprising the plastic shell. In some embodiments, tether element 150 may coil onto and extend from the retraction mechanism housed within the attachment element 120 comprising the lightweight plastic shell. In some embodiments, the retraction mechanism housed within attachment element 120 may be configured to provide coiling and/or retraction of tether element 150. For example, a retraction mechanism may be configured to allow tether element 150 to coil within attachment element 120 resulting in a 300-degree coiling of tether element 150.

In some embodiments, the retraction mechanism may comprise a spring-loaded mechanism configured to extract tether element 150 in a controlled or "slow" fashion. In some embodiments, the retraction mechanism may be configured to allow the pet handler to stop retraction and/or extension of tether element 150 upon retracting or extending tether element 150 to a certain length.

In some embodiments, the retraction mechanism may comprise a locking mechanism, as alluded to above. For example, upon retracting and/or extracting tether element 150 to a desired length, the handler may use the lock to prevent tether element 150 from retracting and/or extending further. By virtue of the locking mechanism, the user may control the length of tether element 150. In some embodiments, the locking mechanism may be unlocked to allow the user to extend tether element 150 so that it can be further retracted and/or extended. In some embodiments, gripping element 153 may be configured to allow the user to lock/unlock the locking mechanism. For example, gripping element 153 may comprise a button that when operated by the user may result in locking and/or unlocking of the locking mechanism. In other embodiments, the user may lock/unlock the locking mechanism my pulling on tether element 150 in a particular direction. For example, when the user decides to extend the length of tether element 150, he may pull tether element 150 into a substantially downward or upward direction. In some embodiments, the retraction mechanism may be configured retract (i.e., coil) tether element 150 back into attachment element 120 automatically.

In some embodiments, restraining system 100 may be configured to detect tension within attachment element 120 as tether element 150 is being retracted or has been fully retracted into the attachment element. For example, restraining system 100 may comprise a sensor 127 configured to sense tension forces exerted by tether element 150. In some embodiments, restraining system 100 may comprise one or more components configured to receive sensor input and transmit instructions to restraining system 100. For example, the one or more components may include a sensing component, a processing component, a memory component, a control component, and/or other such similar components.

In some embodiments, attachment element 120 of restraining system 100 illustrated in FIG. 1 secured on a subject, may be configured to become unsecured (e.g., uncoupled) upon detecting a threshold amount of tension and/or pressure within attachment element 120. The threshold amount of tension and/or pressure may be set by a user (e.g., pet owner), determined by restraining system 100, and/or obtained in other similar ways. For example, as explained above, attachment element 120 may be secured around a pet's neck by having coupling members 128, 129 removably securing first and second ends 122, 124 of attachment element 120 together. In some embodiments, upon detecting a threshold amount of tension forces within attachment element 120, the coupling members 128, 129 may be configured to become uncoupled thereby causing attachment element 120 to become unsecured and letting the subject become unleashed.

Figure 3:
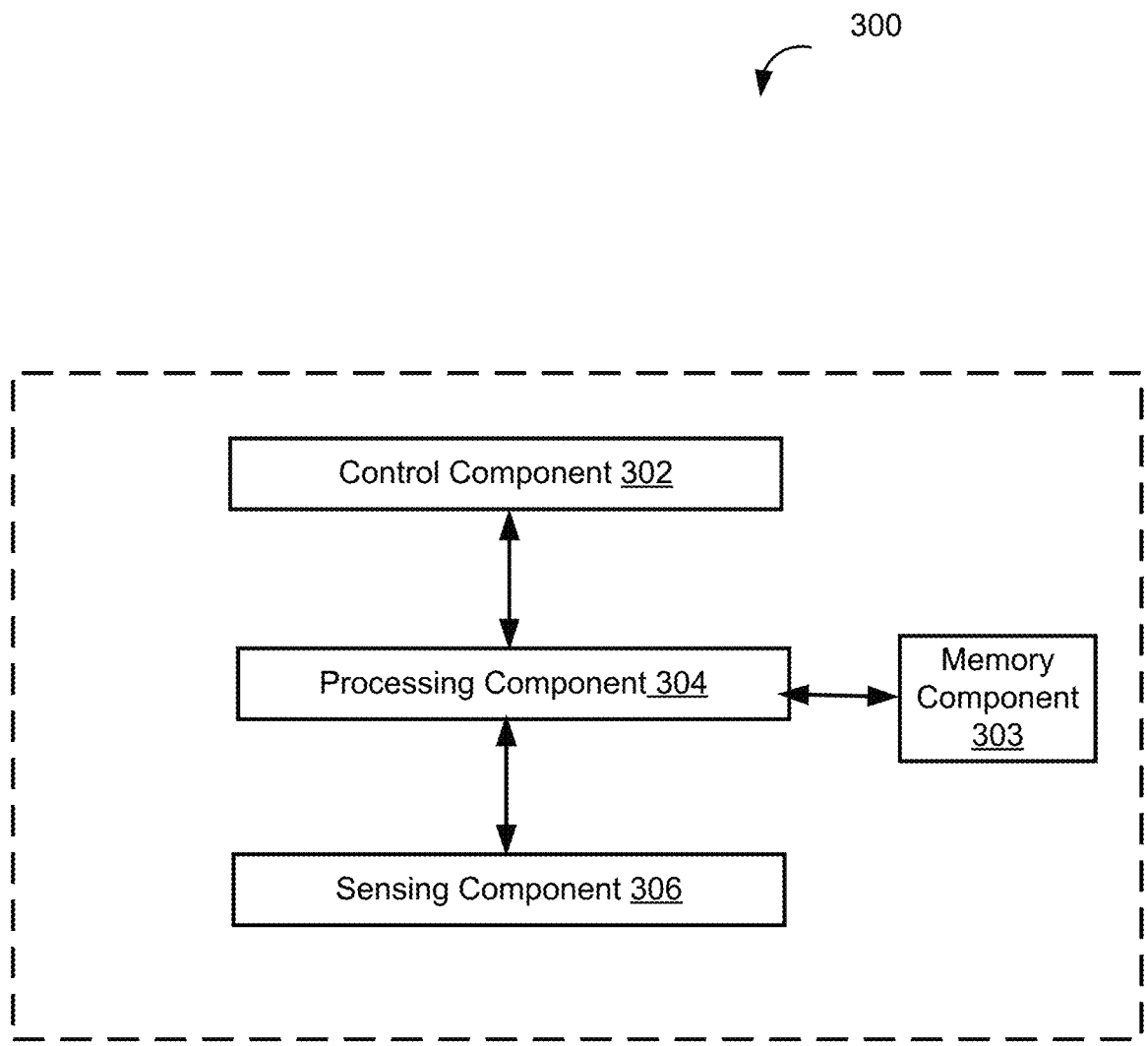
FIG. 3 illustrates a restraining circuit of the of the restraining system of FIG. 1, according to an implementation of the disclosure.

FIG. 3 is a flow chart illustrating example retraction circuit 300 configured to control restraining system 100 illustrated in FIG. 1. A retraction circuit 300 comprises a sensing component 306, a control component 302, a processing component 304, and a memory component 308. In some embodiments, retraction circuit 300 may be configured to receive sensor information as input and provide output data to one or more components of restraining system 100 intended to control restraining system 100 (e.g., uncoupling attachment element 120).

In some embodiments, retraction circuit 300 may comprise a plurality of sensing components, processing components, memory components, and control components configured to control and operate restraining system 100. In some embodiments, sensing component 306 may be configured to obtain sensor information transmitted by one or more sensors. For example, sensing component 306 may be configured to obtain information received from one or more sensors of restraining system 100 (e.g., sensor 127). In some embodiments, sensing component 306 may be configured to obtain information from other sensors, such as accelerometers, gyroscopes, magnetometers, barometers, thermometers, hygrometers, bumpers, chemical sensors, electromagnetic sensors, or microphones (not shown).

In further embodiments, sensing component 306 may be configured to obtain data related to one or more mechanical forces such as tension forces exerted upon attachment element 120. For example, the mechanical forces exerted upon attachment element 120 caused by the retraction or spooling of tether element 150 may be obtained. In some embodiments, sensing component 306 may be configured to obtain data related to one or more mechanical forces, such as tension forces exerted upon tether element 150 by the user. For example, the mechanical forces exerted upon tether 150 by the user pulling or tugging on tether 150 may be obtained.

In some embodiments, processing component 304 may be configured to process data obtained by sensing component 306. For example, processing component 304 may be configured to process data representative of mechanical forces exerted on attachment element 120 or tether element 150.

In additional embodiments, memory component 303 may be configured to store data within the restraining circuit 300. For example, the memory component 303 may store data obtained by the sensing component 306, including historical sensor data and/or user commands.

In further embodiments, control component 302 may be configured to generate one or more control outputs in response to one or more inputs transmitted by processing component 304. For example, control component 302 may be configured to obtain information related to tension forces exerted onto attachment element 120 from processing component 304, which itself is based on the data obtained by sensing opponent 306 (e.g., when tether element 150 is being retraced into attachment element 120). Additionally, control component 302 may be configured to obtain information related to tension forces exerted onto tether 150 from processing component 304, which itself is based on the data obtained by sensing opponent 306 (e.g., a user is pulling on tether element 150).

In some embodiments, control component 302 may generate the one or more control outputs based on the data obtained by sensing component 306 (i.e., without the data determined by processing component 304). For example, control component 302 may generate the one or more control outputs based on the tension force data obtained by sensing component 306.

Figure 4:
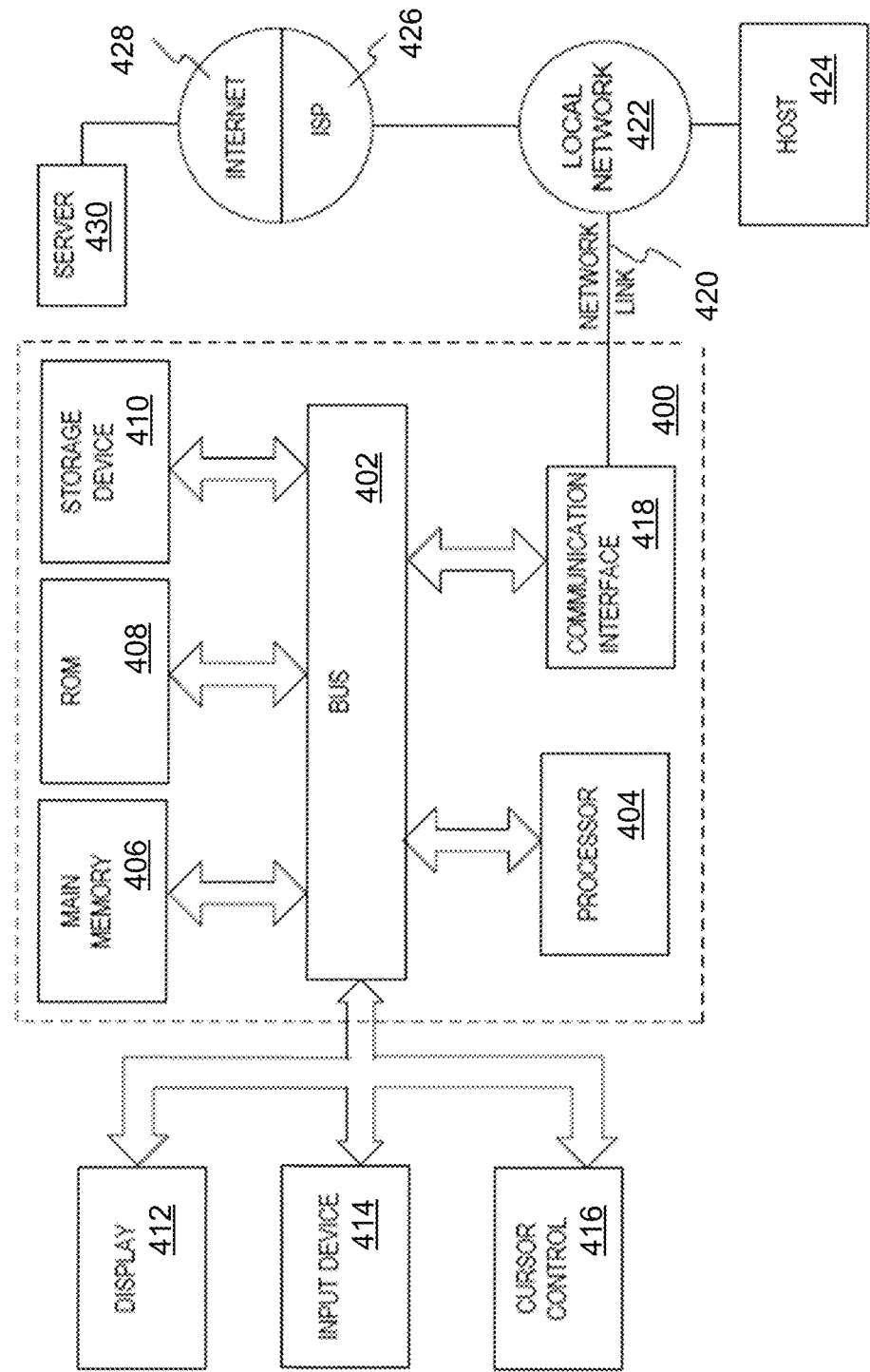
FIG. 4 illustrates an example computing system that may be used in implementing various features of embodiments of the disclosed technology.

In some embodiments, control component 302 may generate control outputs directed to uncoupling the coupling elements 128 and 129 in order to unsecure attachment element 120 from the subject. For example, control component 302 may cause uncoupling coupling elements 128 and 129 upon sensing component 306 detecting the tension forces generated within attachment element 120 caused by the spooling of tether element 120 and posing a serious threat to the subject (e.g., a pet). For example, as alluded to earlier, upon detecting an amount of tension forces within attachment element 120 exceeding a threshold amount of tension forces, the coupling members 128, 129 may be configured to become uncoupled thereby causing attachment element 120 to become unsecured and allowing the subject to become unleashed.

Where circuits are implemented in whole or in part using software, in one embodiment, these software elements can be implemented to operate with a computing or processing system capable of carrying out the functionality described with respect thereto. One such example computing system is shown in FIG. 4. Various embodiments are described in terms of this example-computing system 400. After reading this description, it will become apparent to a person skilled in the relevant art how to implement the technology using other computing systems or architectures.

Referring now to FIG. 4, computing system 400 may represent, for example, computing or processing capabilities found within desktop, laptop and notebook computers; hand-held computing devices (PDA's, smart phones, cell phones, palmtops, etc.); mainframes, supercomputers, workstations or servers; or any other type of special-purpose or general-purpose computing devices as may be desirable or appropriate for a given application or environment, such as for example, the various components illustrated in FIGS. 1-3 and described herein.

FIG. 4 depicts a block diagram of an example computer system 400 in which various of the embodiments described herein may be implemented. The computer system 400 includes a bus 402 or other communication mechanism for communicating information, one or more hardware processors 404 coupled with bus 402 for processing information. Hardware processor(s) 404 may be, for example, one or more general purpose microprocessors.

The computer system 400 also includes a main memory 404, such as a random access memory (RAM), cache and/or other dynamic storage devices, coupled to bus 402 for storing information and instructions to be executed by processor 404. Main memory 404 also may be used for storing temporary variables or other intermediate information during execution of instructions to be executed by processor 404. Such instructions, when stored in storage media accessible to processor 404, render computer system 400 into a special-purpose machine that is customized to perform the operations specified in the instructions.

The computer system 400 further includes a read only memory (ROM) 408 or other static storage device coupled to bus 402 for storing static information and instructions for processor 404. A storage device 410, such as a magnetic disk, optical disk, or USB thumb drive (Flash drive), etc., is provided and coupled to bus 402 for storing information and instructions.

In general, the word "component," "system," "database," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor(s) 404 executing one or more sequences of one or more instructions contained in main memory 404. Such instructions may be read into main memory 404 from another storage medium, such as storage device 410. Execution of the sequences of instructions contained in main memory 404 causes processor(s) 404 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 410. Volatile media includes dynamic memory, such as main memory 404. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 402. Transmission media can also take the form of acoustic or light waves, such as those generated during radio-wave and infra-red data communications.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. As examples of the foregoing, the term "including" should be read as meaning "including, without limitation" or the like. The term "example" is used to provide exemplary instances of the item in discussion, not an exhaustive or limiting list thereof. The terms "a" or "an" should be read as meaning "at least one," "one or more" or the like. The presence of broadening words and phrases such as "one or more," "at least," "but not limited to" or other like phrases in some instances shall not be read to mean that the narrower case is intended or required in instances where such broadening phrases may be absent.

Other implementations, uses and advantages of the invention will be apparent to those skilled in the art from consideration of the specification and practice of the invention disclosed herein. The specification should be considered exemplary only, and the scope of the invention is accordingly intended to be limited only by the following claims.

The invention claimed is:

1. A restraining apparatus, the apparatus comprising: a tether element comprising a loop formed of a retractable leash material, the tether element having a loop portion and a free end portion, the free end portion comprising a first free end and a second free end, wherein a length of the tether element comprises an extendable portion and a non-extendable portion, and wherein the non-extendable portion comprises at least a part of the loop portion of the tether element; and an attachment element comprising a first end and a second end, the first end and the second end adapted to be removably coupled together, and an opening positioned equidistantly between the first and second end, the attachment element encasing a retraction mechanism configured to extend and retract the tether element, the retraction mechanism comprising a first spool positioned at a first end and a second spool positioned at the second end of the attachment element respectively;

wherein the loop portion of the tether element engages the first and second spools and the free end and the first and second free ends extend through the opening of the attachment element;

wherein the tether element is in a fully extended position when the retraction mechanism extends the extendable portion of the length of the tether element through the opening of the attachment element by not unwinding the non-extendable portion of the length of the tether element from the first and second spools of the retraction mechanism, and wherein the tether element is in a fully retracted position when the retraction mechanism retracts the extendable portion of the length of the tether element into the attachment element.

2. The restraining apparatus of claim 1, wherein a distance from the free end portion to the opening of the attachment element is substantially equal to the extendable portion of the length of the tether element when the tether element is in the fully extended position.

3. The restraining apparatus of claim 1, wherein the opening provides a passageway through which the tether element is extended and retracted.

4. The restraining apparatus of claim 3, wherein the free end portion of the tether element comprises a handle adapted to be recessed within the attachment element when the tether element is in the fully retracted position.

5. The restraining apparatus of claim 1, wherein the retraction mechanism extends the tether element upon applying an external force to the free end portion of the tether element.

6. The restraining apparatus of claim 1, wherein the retraction mechanism retracts the tether element when no external force is applied to the free end portion of the tether element.

7. The restraining apparatus of claim 1, further comprising a locking mechanism configured to prevent the retraction mechanism from extending or retracting the tether element further.

8. The restraining system of claim 1, wherein the retraction mechanism comprises a sensor configured to detect a tension force within the attachment element.

9. The restraining apparatus of claim 8, wherein the first and second ends of the attachment element are detached upon detecting the tension force within the attachment element being greater than a threshold amount.

10. A method for restraining a subject, the method comprising:
    removably securing an attachment element around a subject by coupling a first end and a second end of the attachment element together, the attachment element encasing a retraction mechanism configured to extend and retract a tether element through an opening positioned equidistantly between the first and second end of the attachment element, wherein the tether element comprises a loop formed of a retractable leash material, the tether element having a loop portion and a free end portion, the free end portion comprising a first free end and a second free end, and wherein a length of the tether element comprises an extendable portion and a non-extendable portion, and wherein the non-extendable portion comprises at least a part of the loop portion of the tether element;
    extending the extendable portion of the length of the tether element through the opening of the attachment element upon applying an external force to the free end portion of the tether element; and
    retracting the extendable portion of the length of the tether element into the attachment element when no external force is applied to the free end portion of the tether element.

11. The method of claim 10, wherein the extending the extendable portion of the length of the tether element comprises unwinding the loop portion of the tether element from a first spool and a second spool of the retraction mechanism; and
    wherein the retracting the extendable portion of the length of the tether element comprises winding the extendable portion of the length of the tether element onto the first and second spools of the retraction mechanism.

12. The method of claim 11, wherein the extending the extendable portion of the length of the tether element comprises not unwinding non-extendable portion of the length of the tether element from the first and second spools of the retraction mechanism.

13. The method of claim 10, wherein the retracting the extendable portion of the length of the tether element into the attachment comprises reducing a distance between the free end portion of the tether element and into the opening within the attachment element;
    wherein the free end portion of the tether element comprises a handle; and
    wherein an external surface of the attachment element is substantially flush with an external surface of the handle when the tether element is in the fully retracted position.

14. A restraining system, the system comprising:
    a tether element comprising a loop formed of a retractable leash material, the tether element having a loop portion and a free end portion, the free end portion comprising a first free end and a second free end, wherein a length of the tether element comprises an extendable portion and a non-extendable portion;
    an attachment element comprising a first end and a second end, the first end and the second end adapted to be removably coupled together, and an opening positioned equidistantly between the first and second end, the attachment element encasing a retraction mechanism configured to extend and retract the tether element, wherein the retraction mechanism comprises a first spool positioned at a first end and a second spool positioned at the second end of the attachment element respectively, wherein the loop portion of the tether element engages the first and second spools and the free end and the first and second free ends extend through the opening of the attachment element;
    a sensor component configured to detect a tension force within the attachment element;
    a processing component configured to determine if the tension force within the attachment element exceeds a threshold amount; and
    a control component configured to detach the first and second ends of the attachment element;
    wherein the tether element is in a fully extended position when the retraction mechanism extends the extendable portion of the length of the tether element through the opening of the attachment element by not unwinding the non-extendable portion of the length of the tether element from the first and second spools of the retraction mechanism, and wherein the tether element is in a fully retracted position when the retraction mechanism retracts the extendable portion of the length of the tether element into the attachment element.

15. The restraining system of claim 14, wherein the control component transmits an output to the attachment element to detach the first end of the attachment from the second end of the attachment element upon obtaining input from the processing component indicating that the tension force within the attachment element exceeds the threshold amount.

16. The restraining system of claim 14, wherein the sensor component is configured to detect a tension force within the attachment element when the tether element is in the fully extended position.

17. The restraining system of claim 14, wherein the sensor component is configured to detect a downward force exerted onto the tether element.

* * * * *